Feb. 11, 1958 E. B. NOLT ET AL 2,822,749
HAY BALERS
Filed Jan. 26, 1952 8 Sheets-Sheet 7

Inventors
Edwin B. Nolt
Richard R. Eby
Richard E. Babcock Jr.
By
Attorney

United States Patent Office 2,822,749
Patented Feb. 11, 1958

2,822,749

HAY BALERS

Edwin B. Nolt, New Holland, and Richard R. Eby, Ephrata, Pa., assignors, by mesne assignments, to Sperry Rand Corporation, a corporation of Delaware Application January 26, 1952, Serial No. 268,424

14 Claims. (Cl. 100—23)

Our invention relates to wire tying mechanism for automatic hay baling machines though it may have certain other adaptations, at least certain features of it may have certain other adaptations.

The principal aim of our invention is the achievement of a wire tying mechanism which will handle relatively light and small diametered wire reliably rapidly and efficiently. Of recent years the price of the hemp cordage commonly used in connection with relatively light moderately compacted bales has been steadily rising and there has been considerable shortage. Relatively heavy and large diametered wire has been commonly used for the highly compacted heavier bales, but its strength, weight, and cost are each higher and non-economical as applied to lighter bales.

We achieve our principal aim largely through the use of a new method and means for the holding of the free end of the bale loop and the laying of this free end in the wire tie device or twister per se coupled with new means of holding the wire ends to be tied together and fixing them in the lays during the tying operation.

Maximum economy is a further aim, as it has been found that the wire tying of light bales in accordance with the invention may be accomplished at a fraction of the cost per bale as is possible with twine.

We maintain the amount of wire per bale at a minimum by the employment of an exact means for metering the length of the free end. The nature of the twist we have chosen for the tie is also contributory.

Tying the bale closely and tightly without over stressing the lighter wire during the tying operation is also an object. We have achieved this by providing clamping means for fixedly holding the wire near its free end while the free end is yieldingly gripped and laid in the twister by a wire laying device.

The higher rates of production in bales per minute of the machines producing small bales have required that a mechanism utilizing light small diametered wire operate at higher speeds reliably and efficiently and without break down of parts. To these ends we have provided for more accurate and convenient adjustments of both the individual timing cycles and their timed relations to each other. A special provision has been made to guard against and eliminate lost motions. Continuously developed potential energy is utilized for driving the tying or twisting device per se. A yielding connection in the drive guards the tying device per se against breakage. Positive aligning and positioning devices are provided for the needle and the wire of the needle loop in its approach to and occupation of its loop presenting position with respect to the tying device per se.

The attainment of a construction as simple and economical as practically possible with the attainment of the foregoing ends has been constantly before us.

Yet other advantageous features of our invention will appear and be made clear through the drawings and the detailed specification. Perhaps one among these others needs mention at this time. It is the improvement in the plunger latch or lockout mechanism which we use to keep the plunger at rest at the rear end of the bale during the tying operation. Extreme simplicity and thoroughgoing reliability of this device are had through effecting a close proximity relationship and direct actuating connection between the latch and the needle movement.

In the accompanying drawings we show that embodiment of our invention which is at the present time best known to us, an embodiment which we have built and subjected to thoroughgoing tests. Without doubt however, there are other embodiments than those known to us which fall within the over all generic spirit or within the generic spirit of the various components of our invention.

Figures 1 to 4 show both the general arrangement and a considerable amount of the detail of the mechanism. The salient devices comprise the wire tying device 40, the wire laying device 41, the wire transfer device 42, the needle means 43, a principal timing mechanism 44 of a revolving character, a secondary timing mechanism 45 of an oscillatory character, and a baling plunger latching device 46, all arranged about the bale case 47, and all of the several devices excepting only the needle means 43 being arranged on top of the bale case. The needle means is supported from the sides of the bale case and the needles per se are projected upwardly through the bale case from the bottom. It will be observed that each the wire tying, the wire laying, the wire transfer, and the needle devices are provided in duplicate, in two longitudinally extending series, each of which is adapted to achieve a wire tie about a bale, while the principal and secondary timing mechanisms 44 and 45 and the plunger latch device 46 respectively serve the other devices in common. The various devices will now be described in detail in the order named and as they are described their interconnections and interrelations will be set forth. At this juncture however it will have been observed from Figures 1 to 4 that the wire tying, the secondary timing mechanism, and the plunger latch device are each connected for actuation with the principal timing mechanism 44, while the wire laying device 41, the wire transfer device 42, and the needle means 43 are in turn each connected for actuation to the secondary timing mechanism 45.

The wire tying device

Figure 5:
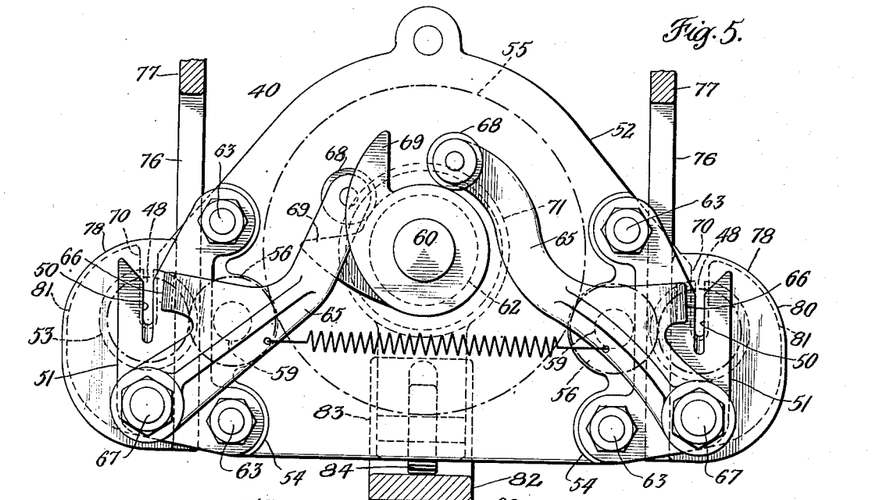
Figure 5 is a front (forward) elevation of the wire twisting and cutting mechanism per se used in accomplishing the tie. The view is taken approximately on line 5—5 of Figure 2.
Figure 6:
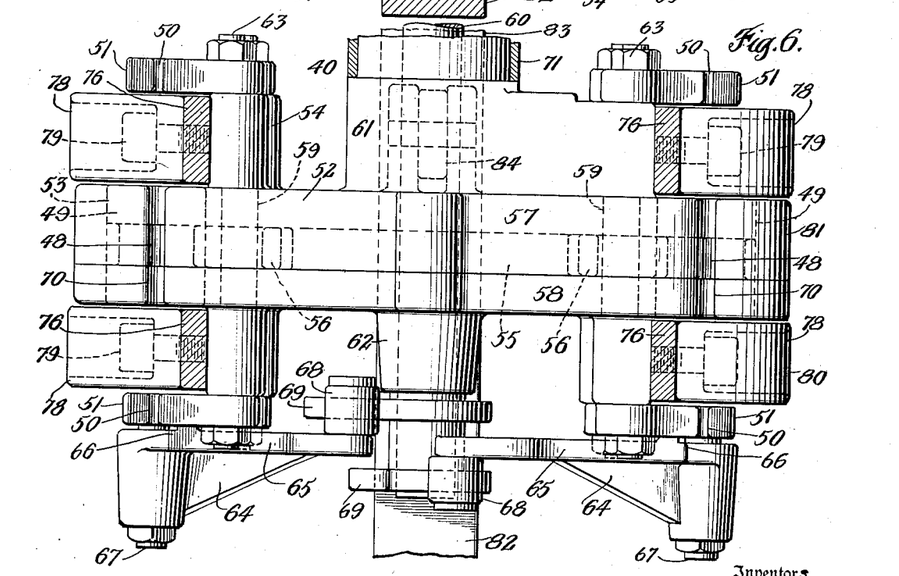
Figure 6 is a top plan view of Figure 5.

The wire tying device 40 is depicted especially in the enlarged elevation and plan views of Figures 5 and 6. The tie per se is a twist (or more properly speaking a double twist as can be clearly seen from an inspection of Figure 7) and the particular wire tying device shown is therefore properly termed a wire twisting device. This tie or twist as we shall now term it is achieved by laying the portions of the wire to be twisted together in the slot 48 of a twister gear 49 and the axially aligned slots 50 of a pair of axially spaced anvil members 51. As can be discerned from Figures 5 and 6 but seen with clearness especially in Figures 7 and 8 the twister gear 49 is a tripartite affair comprised of three disk like portions riveted or otherwise suitably secured together. The center one only is toothed for gear driving while the two outer ones which are of the over all diameter of or greater in diameter than the central portion to a slight degree, are provided with smooth peripheries to constitue them journal portions for the gear. The slot 48 in the central gear portion is relatively narrow and of but slightly greater width than the diameter of the wire it is supposed to receive, while the slot 48 in the two outer portions is widened to a degree slightly greater than twice the diameter of the wire received. The width of the slots 50 corresponds essentially to the width of the slot 48 in the central or gear toothed portion of the twister gear 49. Thus, the two portions of the bale tie (or two ends we may call them at this juncture) are held in superimposed relations as laid in each the central gear portion and the two anvils. Therefore when the twister gear 49 is rotated, the anvils 51 being stationary, the wire lays are twisted together right and left of the central gear toothed portion of the twister gear and between this portion and the anvils.

The twister gears 49 are journaled in the outer and lower extremities of a transversely bipartite twin gear casing 52, bores 53 being provided for this purpose, while the anvils 51 are fixedly secured as by bolting to lateral extensions 54 from this casing 52. The bipartite casing 52 houses a centrally located driving gear 55 and the idler pinions 56 which are intervened drivingly between it and the twister gears 49. The main body 57 of housing 52 which encompasses the various gears and its cover plate 58 together support and journal in proper axial relation the pintles 59 of the idler gears 56 and the main driving shaft 60 to which the driving gear 55 is keyed. Extensions 61 and 62 from the housing 52 provide extended journals for the main driving shaft 60. Four through bolts 63 joined together the two parts 57, 58 of the housing 52 and the same time secure in place the four anvils 51.

Wire cutting device

Included in the wire tying device 40 at large are a pair of wire cutting devices 64. These comprise wire cutting levers 65 provided with laterally projected shearing edges 66 bearing on the front inner faces of the front anvils 51 and adapted to be swept across the outer ends of the slots 50 and either alone or in coaction with the outer edge of the slots 50 to shear off a wire strand. These levers are mounted for oscillation about bearing pintles 67 fixedly projected from the lower portions of these front anvil members 51. Their upwardly and inwardly extended ends are provided with cam followers 68 which are acted upon by cams 69 revolved by drive shaft 60. The levers 65 lie in the same plane but the followers 68 project from them in opposite direction, the cams 69 being axially spaced apart appropriately to engage the oppositely directed followers. The levers 65 are moreover of different length from pintle 67 to cam follower 68 and the cams 69 are while generally of the same form angularly spaced apart on shaft 60 in such fashion that the two cutting devices 64 are successively operated to the end of avoiding simultaneously imposing the cutting loads and unduly raising the driving torque necessary. Cutting levers 65 and the associated anvils 51 as a unit in each case constitute a cutting mechanism assembly.

Wire stripping mechanism

It will have been observed that the housing 52 of the wire tying mechanism is provided at each of its opposite lateral extremities with a relatively wide open slot extending vertically downward from the top to and including the axis of the twister gear journal, this slot being numbered 70. This not only enables the wire lays to be made freely in the slots 48 and 50 of the twister gear anvils, but also permits the twist of the tie to be freely removed once the tie has been completed. The mechanism for this removal is extended in nature and comprehends (see Figure 2 and Figures 13 and 14 in conjunction with Figures 5 and 6) a train of elements extending all the way from the primary timing mechanism 44 to the secondary mechanism 45. First in the train of mechanism is the hollow tubular arm 71 to which the housing 52 of the wire tying device 40 is rigidly attached at the forward extremity of arm 71, in such manner that the axis of the arm 71 coincides with the axis of the drive shaft 60. Arm 71 at its rear end is rigidly attached to the forwardly and laterally extended arm of a Z-shaped casting 72 the rearward and outwardly extended arm of which is journaled freely about the central supporting shaft 73 of the primary timing mechanism 44. The rear end of shaft 60 is journaled in this casting as well as in the twister gear housing 52. At this rear end it is provided with a bevel gear 74 in mesh with a similar gear 75 also journaled freely on shaft 73 and driven from a source of power in a manner which will subsequently appear. The result of this mounting of the wire tying device 40 is that it may be oscillated bodily about the axis of shaft 73 without disturbing the connection of drive shaft 60 to its ultimate source of power.

Provision for that relatively small degree of such oscillation as is needed for the stripping action of the mechanism is made by mounting wire tying device 40 for limited substantially vertical movement of levitation between the downwardly depending arms 76 of a pair of fixed vertically extending laterally spaced apart mounting and guiding plates 77 rising from and anchored to bale case 47. Arms 76 depend toward the top of the bale case from the overarched central portions of these supporting and guiding plates 77. Figures 1 to 4 delineate this construction most clearly but the depending arms 76 also appear in Figures 5 and 6. Particularly in these latter figures one sees that the inner faces of arms 76 bear against and guide the outer faces of the extensions 54 which space the anvil 51 apart, while the sides of the arms 76 bear against the sides of the housing 52 on the one hand and the inside faces of the anvils 51 on the other whereby the wire tying device 40 is guided and positioned longitudinally.

Sufficient clearance is allowed between the inter-engaging side faces of arm 76 and anvils 51 and housing 52 to take care of the arc of movement about shaft 73.

Figure 7:
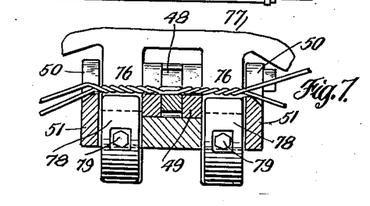
Figure 7 is a sectional elevation of the twisting gears, anvils and strippers utilized in the tying device per se as shown in Figures 5 and 6, the section being taken in the plane of the wire twist which constitutes the tie.
Figure 8:
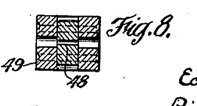
Figure 8 is a horizontal section through the twister gear per se taken in the horizontal plane of the twist.

Laterally protruding elements called strippers and designated 78 are mounted one on each side of the twister gears 49. They are designated 78 and shown as secured to the lower ends of the depending arm 76 by a unitary central securing bolt 79 whose heads are housed within the hollow interiors of these strippers. The manner of securement is such as to permit a slight oscillation of element 78 about their securing bolts 79 whereby to accommodate them to the arcuate vertical movement of the tying device 40, for these members 78 practically fill the space between the extremities of the housing 52 and the adjoining anvils 51. The outer peripheries of these members are generally arcuate in form and extend first outwardly then downwardly and then inwardly of the arm 76, presenting a smooth curved surface lying outside of the similarly curved surface 81 of the lateral extremities of the housing 52. Referring now particularly to Figure 7 which occurs on the same sheet with Figures 24 to 27 it will be apparent that if the wire portions to be joined together are laid and twisted while the anvils 51 and the twister gear 49 are in the raised position shown in Figure 7 with the bottoms of slots 48 and 50 just above the tops of the strippers 78, then when the housing 52 with the twister gears 49 and the anvils 50 which it carries, is lowered, the upper curved surfaces of the strippers 78 will engage the twist of the wire and not only prevent its following gears 49 and anvils 51 to their lowered position but also will simultaneously lift the twist from the slots and upon its becoming free, will permit the tension of the tie to slip the twisted ends over the outwardly and downwardly inclined surfaces 80 to ride freely downwardly and inwardly into position on top of the bale.

The stripper mechanism means for affording and controlling this relative vertical movement between twister gears 49 and anvils 51 on the one hand and strippers 78 on the other is comprised in part of a longitudinally reciprocable cam bearing member 82 operated from the secondary timing mechanism 45 (see Figures 1 to 6 inclusive) and bearing an upwardly inclined cam 83 engaging a following cam roller 84 carried by the housing 52 on its under side; and in part by a latching mechanism 85 controlled from the primary timing mechanism 44 and connecting with the cam bearing member 82 through an offset longitudinally extending rod 86. Arm 82 (perhaps more properly termed a bar) at its forward end is provided with an upward extension 87 (see Figures 1 and 2) which bears at its extremity underlying the shaft 88 of the secondary timing mechanism 45 a cam follower 89 in a position to be engaged by cam 90 carried by shaft 88. When shaft 88 is oscillated cam 90 first engages follower 89 to draw bar 82 and cam 83 forwardly to lift the wire tying device 40 upwardly until wire receiving slots 48 and 50 are verticaly just above the tops of the stripper 78, and then to ride follower 89 over the cam surface 91 of fixed radius, thereby holding the elements in these relative positions for the time being. A retracting spring 92 between the extension 87 of bar 82 and an over arching fixed bar 93 fixed to the bale case biases bar 82 rearwardly and urges follower 89 against the surface of cam 90.

Timing mechanism 45 is of an oscillatory character and shaft 88 with cam 90 oscillates. Having oscillated counter clockwise to achieve the lift of the wire tying mechanism just described, in due course it is oscillated clockwise whereupon spring 92 tends to move cam 83 rearwardly and permit the wire tying device 40 to return to its lower position. It is prevented from immediately doing so by the latching mechanism 85 which engages the rearwardly extending rod 86. The central element of this latching mechanism 85 is a latch or trigger 94 in the form of a bell crank pivoted to the bale case at 95 on a transversely extending axis and having a rearwardly extending arm provided with a lateral extremity 96 normally overlying the top of the rod 86 and adapted when the rod is drawn forwardly by the forward movement of the cam 83 to slip downwardly over the extremity of rod 86, and so prevent retraction of cam 83 by spring 92 until latch or trigger 94 is moved clockwise. Latch 94 is biased counter-clockwise to latching position over the end 97 of rod 86 by a spring 98 connecting its upwardly extending arm with a fixed support 99 erected from the top of the bale case. (See Figures 15 and 16 for the detail of this latch.) As clearly appears from Figures 15 and 16 member 99 has an overhang 100 which engages the arm of latch 94 and limits upward movement thereof. Downward movement is limited by the engagement of the lower edge of the arm with the top of the bale case 47. Of course other limiting means may be provided if desired.

Release of the latch is provided by the hammer blow device 101. This is in the form of a longitudinally extending bar whose forward end is slotted as at 102 and passed over a pin or bolt 103 fixed to the upper end of latch 94, and whose rear end is passed through a slot 104 of elongated character in an upright member 105 which is based on top of the bale case. A spring 106 connects at one end with the pin 103 and at the other end with the body of the bar 101 rearwardly thereof and normally biases the bar 101 onto the pin 103 at the rear end of the elongated slot 102. On its underneath side bar 101 is provided with a downwardly extended projection or dog 107 which normally lies in the path of movement of a pin 108 (see particularly Figures 1 and 2 and the detail of Figure 14) which projects axially from a member 109 which is rotated about the shaft 73 of the primary timing mechanism 44 in a manner presently to be described. The engagement of the dog 107 by the pin 108 in its rotation while the latch 94 is engaged over the end 97 of the rod 86 will first move the bar 101 rearwardly against the tension of spring 106 and then as the pin 108 proceeds further in a counter-clockwise direction will release dog 107 and bar 101, whereupon the bar 101 will fly forwardly and engage the pin 103 by the bottom of slot 102 in a hammer blow which quickly removes the latching portion 96 from the end 97 of rod 86, permitting cam 83 to move suddenly rearwardly and wire tying device 40 to drop to its normal lowered position. In this drop its motion is accelerated through the strong downward pull of a retracting spring 110 stretched between the overarching bar 93 forward of the mechanism 40 and the outer end of a forwardly and upwardly extending arm 111 secured to the gear housing 52 (see Figure 1).

The wire laying device

The wire laying device 41 of our invention we have adapted for the laying of both the free end of the bale loop and of the bale strand portion of the needle loop to be joined thereto. Its central element is what is commonly known as a "gripper" 112 which is reciprocated substantially in the vertical plane of the twister gear and substantially in the vertical plane of the twister gear and substantially in the vertical plane of the twister gear and ward end is downwardly extended vertically almost to the bale case, its extremity being below the lowermost position of the bottoms of slots 48, 50. Element 112 is guided in this path by a roller 113 borne in a slot 114 in the same supporting and guiding plate 77 which positions and guides the wire tying mechanism 40 through the depending arms 76. Gripper element 112 is rigidly supported from the rearward end of a short bar 115 whose forward end is supported and guided in a forward extension of the over arching slot 114 by a roller 116 on an axis fixed to the forward end of the bar. The fixing of the gripper element 112 to the bar 115 is by means of the through bolt 117 which is formed integral with the head 118 of the element. In series between the head 118 and the nut 119 on the end of the bolt 117 are a flanged bushing 120, the body of the bar 115 itself, a bushing 121 which constitutes the journal for the roller 113, and a large diametered washer 122 of a size to bridge the slot 114. Nut 119 clamps all these elements together and about the bar 115 with suitable tolerances between the sides of the groove carrying plate 77 and the head 118 and bar 115 on one side of the plate and the washer 122 and the other side of the plate. At the other end of the bar 115 roller 116 is journaled on or rather about the integral shank of the square headed bolt 124, the shank being designated 123. Nut 125 on its part clamps together about a bar 115 and between head 124 and itself parts as follows; bushing or shank enlargement 126, bushing 127 constituting the journal for the roller 116 and for operating link 128, and washer 129. As in the case of the element 112 there are clearances provided between the opposite faces of the guide plate 77 and the bar 115 on one side and the operating link 128 on the other. The result is the ensemble including elements 112 and 124 as supported from the bar 115 may be freely reciprocated along the path defined by the groove 114 and its end extensions. Link 128 through its connection with crank 130 carried by shaft 88 of the oscillating timing mechanism 45 affords the means of reciprocation. So reciprocated if the gripper element 112 is engaged with the free end of a wire loop about a bale it may carry that free end along the path 114 and descending into the downwardly extended rear end of groove 114 lay the free end of the bale loop in the slots 48 and 50 of the twister gear 49 and its associated anvils 51. Freed of the extremity of the free end of the wire as it lies in the downwardly extended rear end of groove 114, gripper 112 is in position to receive the bale strand of a needle loop which presents that portion of the wire tie to be joined to the free end, and on its return stroke forwardly to lay this portion of the wire in grooves 48 and 50 alongside of, indeed on top of the lay of the free end.

The needle means

Figures 3, 4:
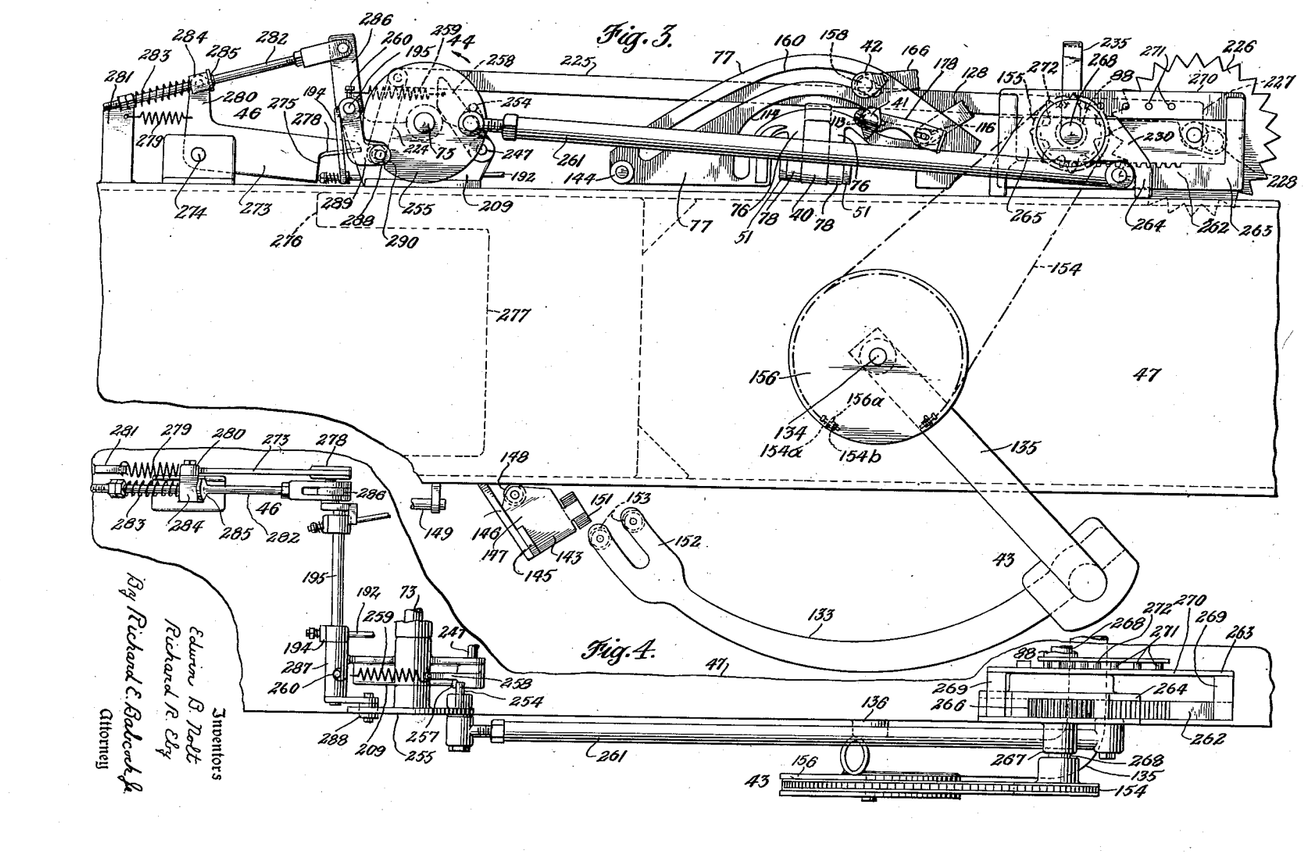
Figure 3 is a general side elevation of that portion of the bale case surmounted by the wire tying mechanism showing in side elevation all parts groupings of the mechanism including their locations. The view not only includes the bale metering wheel and the plunger latch mechanism in its entirety but also the needles.
Figure 4 is a plan view of those several parts groupings of the mechanism which lie closest to the right hand side of the bale case, that side from which the elevation of Figure 3 is taken, and extended at the left toward and beyond the center of the bale case to show fully the plan view of the plunger latch mechanism.
Figure 17:
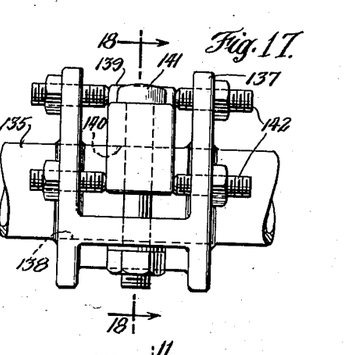
Figure 17 is a front elevation of the mounting of the base of a needle upon the needle yoke.
Figure 18:
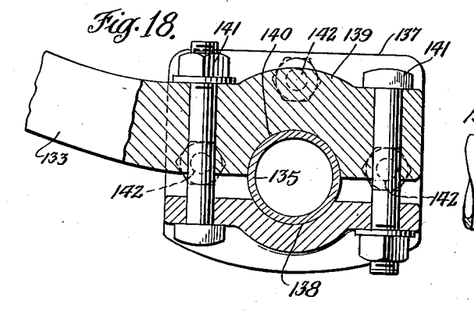
Figure 18 is a central vertical section of this mounting taken on line 18—18 of Figure 17.

Needle means for presenting the needle loop to the vicinity of the wire tying mechanism atop the bale case 47 appears ever so clearly in Figure 3 and Figure 4, though the loop bearing ends of the needles (there are two of them, they being provided in duplicate as are the other devices one on each side of the central plane of the bale being formed)—though the loop bearing ends of the needles appear in the enlarged ends 131 of the bale case slots 132. The two needles 133 are of arcuate extent about the needle axis 134 and of gradually tapering cross section from base to loop bearing end as usual. They are carried by a needle yoke 135 of U-form the arms of which flank the sides of the bale case 47 and are journaled on axis 134 of the needles 133. Bosses 136 on the side of the case support this axis 134 in the form of laterally projecting studs. The mounting of the needles on the yoke (now see Figures 17 and 18) is such as to provide for their adjustment in all directions. A yoke 137 H-shaped in elevation and also in axial cross section is threaded (that is to say slipped) over the body of needle bearing yoke 135 through somewhat enlarged holes in the vertical sides of the H and then arcwelded in place with its plane of symmetry substantially in alignment with the expected plane of symmetry of the needles 133 themselves. The cross branch of the H is provided with an arcuate seat 138 substantially complemental to the circular cross-section of the body of the tubular yoke to aid in alignment prior to welding in place. The base end of the needle is provided on its under side with a similar arcuate seat 140 for the purpose of preliminarily seating and aligning the needle body substantially in the plane of symmetry. A pair of clamping bolts 141, one on each side of the yoke 135 is passed commonly through the base 139 of the needle and the cross branch of the mounting yoke 137, the longitudinal depth of the mounting yoke being adequate for this purpose. Obviously such a mounting provides freely for adjustment of the needles annularly about the yoke 135 to adjust the radius distance of their loop bearing ends toward and from the axis 134. The upper portions of the vertical branches of the H shaped mounting yoke 137 are decidedly longer than the lower branches, and each of them has threaded through it a group of three set screws 142 bearing upon the adjacent side wall of the base 139 of the needle. One set screw of each group bears against the top of the side wall, or near the top, in the axial plane of symmetry of the mounting. The other two set screws of each group bear upon the side wall near the bottom approximately in a transaxial plane substantially at right angles to the plane of symmetry and one on each side of the axis. The set screws are respectively opposed to each other in their bearing upon the side walls of the needle base 139. Obviously by oppositely adjusting axially the uppermost set screws of the group against the lowermost screws of the group the needles can be shifted angularly; while if the said screws lying on one side of the axis are adjusted oppositely to those lying on the opposite side of the axis a laterally swinging movement of the needle about the region of mounting will result. More importantly however assuming the socket 140 to have been accurately made in the needle and the yoke 135 to be in alignment, by adjusting all three set screws on the one side and simultaneously letting off all three set screws on the opposite side the yoke may be given a bodily movement of translation laterally to accurately define its position on the yoke 135 and its path of movement through the bale case. Jam nuts fix the set screws in their adjusted positions.

Figure 2:
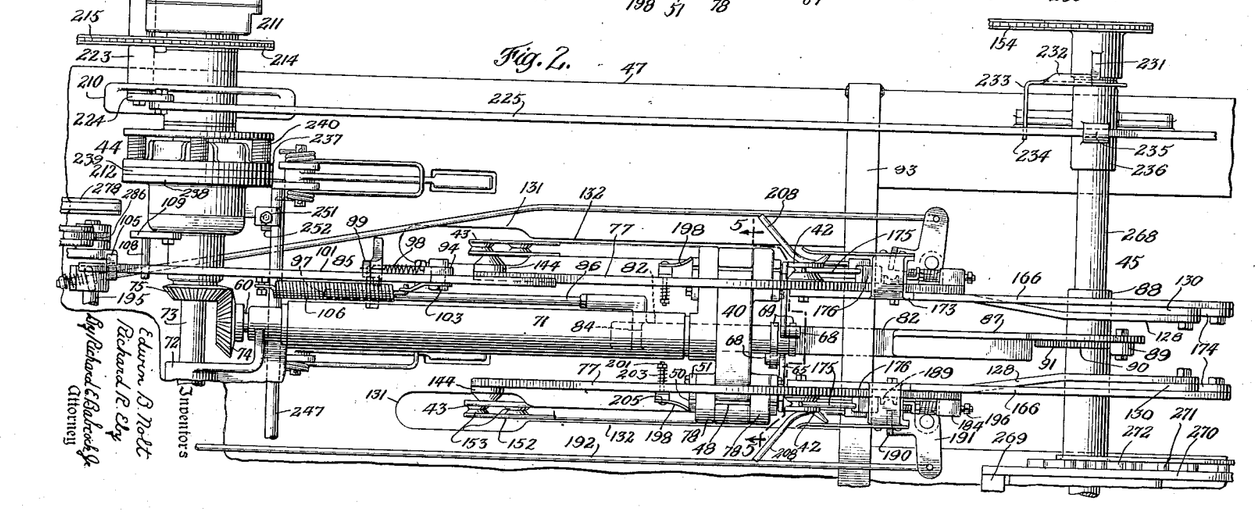
Figure 2 is a plan view of Figure 1.
Figure 19:
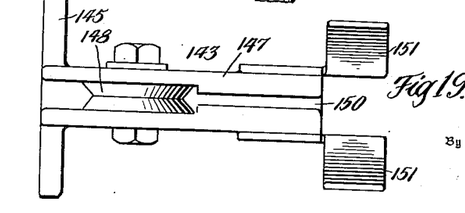
Figure 19 is a plan view of the combined needle and wire guide which appears in elevation opposite the point of the needle in Figure 3.
Figure 20:
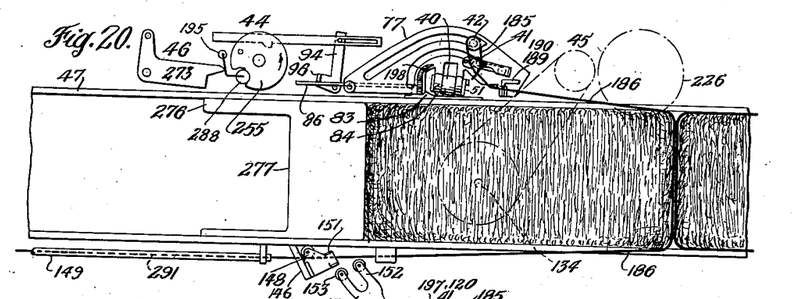
Figures 20 to 30 inclusive are diagrams delineating the various phases of the operation of the wire tying mechanism of our invention in accomplishing a wire tie about a bale, the salient portions of the wire tying mechanism in the various views being shown in elevation as from the right hand side of the bale case and the bale case and bales being represented in longitudinal section.

Cooperating with the needle as so adjusted for proper travel through the bale case with the needle loop of wire we provide the combined needle and wire guide 143 supported from the under side of the bale case 47 and a needle loop end positioning gauge 144 supported from the rearward end of the guide plate 77 (see Figures 2, 3 and 19, the latter appearing on the sheet with Figures 28 to 34). The combined wire and needle guide 143 comprises a base piece 145 by means of which the member is mounted upon the downwardly and rearwardly extended mounting arm or bracket 146 secured to the under side of the bale case 47. Two broad wings 147 spaced slightly apart extend rearwardly from this base. Between them at the top portions is journaled a wire guide pulley 148. Their forward portions are brought slightly closer together to accommodate and guide a wire run under the pulley 148 from the mouth of wire guide tube 149 extending from the wire coil (not shown) and extended rearwardly through the bottom slots in the bale case (not shown) by the bale loop drawn out by the bale as it is progressed rearwardly. A bottoming piece 150 closes the bottom of the space between the wings 147 and provides a bottom rest for the wire insuring its substantial tangency as it is led forward beneath the pulley 148. Forward extension pieces 151 welded to the outsides of the forward portions of wings 147 extend beside the path of the needle 133 and their upper and lower margins are extended somewhat and flared outwardly along the path the better to receive and guide the needle 133 and ultimately to accurately position the loop end 152 of the needle by engagement with the flanks of its rearward fork so that the loop forming and holding pulleys 153 of its bifurcated end are certain to engage the wire of the bale loop which is being extended beneath and tangent to pulley 148.

The surface of the under side of the needle 133 lies on such an arc about the axis 134 as to clear the forward edges of needle guides 151. As the rearward fork of the loop end 152 passes through the guides it clears from them, but already the wire loop is being correctly formed through the engagement of the pulleys 153. Then at the upper extremity of the needle movement the rearward fork of the end 152 engages and is accurately positioned by the gauge 144 on plate 77. This gauge is in the form of a knob of frustro conical form. The properly adjusted needle lightly bears against the conical sides of the gauge knob and slides to a position of rest with the inside face of the rearward bifurcation at rest on the frustrum of the knob. Such an adjustment of the needle is most readily had through the mounting means depicted in Figures 17 and 18.

The needle means 43 is connected with the oscillatory secondary timing means 45 for oscillatory movement thereby through a chain 154 passed over a sprocket 155 mounted on the shaft 268 of the timing mechanism and having its opposite ends relatively adjustably but none the less fixedly connected with the periphery of a drum or disk 156 fixed by welding to the outer arm of needle yoke 135. A similar drive for the opposite arm of the yoke 135 is provided on the opposite side of the bale case as indicated by the chain 154 partially shown in the plan view of Figure 2. The relatively adjustable securing means for those ends of the chain connected with the disk 156 comprise bolts 154a fixedly secured to the respective chain ends and slidably disposed through eyelets 156a fixed on the disk 156, jam nuts 154b being threaded on the free ends of the respective bolts to draw these through the eyelets 156a as desired. These permit proper tensioning of chain 154 and also permit accurate adjustment of the terminal points of the needle movement, so that the movement of the needles may be accurately timed and correlated with the movement of the wire transfer device 42.

*The wire transfer device*

Figure 10:
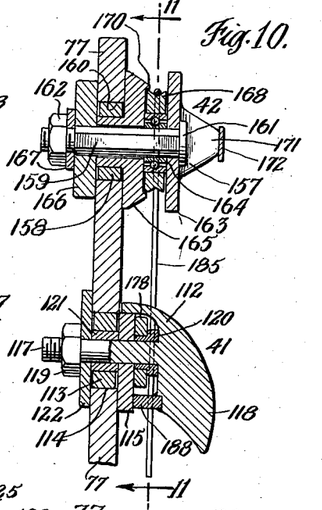
Figure 10 is a vertical section showing both the head or gripper element of the wire laying device and the head or gripper element of the wire transfer device, the section being taken approximately on line 10—10 of Figure 1.
Figure 11:
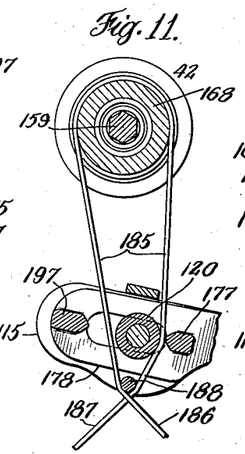
Figure 11 is a vertical section of the elements shown in Figure 10 taken substantially on line 11—11 of Figure 10.

The function of the wire transfer device as has been outlined in general is to engage the needle loop as presented by the needle loop end 152 of needle 133 and transfer it by forward elongation to the forwardly more remote wire laying device. The salient element of the wire transfer device 42 like the salient element of the wire laying device 41 is comprised of a "gripper," in this case designated 157. This element (see Figures 1 to 3, 10 and 11) like the gripper 112 of the wire laying device 41 traverses an overarching path, but in this case the path lies above the path traversed by the element 112 and extends rearwardly and downwardly considerably beyond it. The member 157 is confined to this path by a roller 158 surrounding pintle 159 of the member and traveling in a groove 160 formed in the same plate member 77 in which groove 114 is formed. As clearly appears in Figures 10 and 11 the pintle 159 is polygonal in section. Clamped tightly together upon this polygonal section, and except for the ball race to be mentioned having bores which fit the polygonal section, and lying between the head 161 of the pintle and the clamping nut 162 threaded onto its inner end, are in series the head per se 163, the inner race 164 of a ball bearing, the flanged journal of the roller 158, the rearward end of an actuating lever 166, and a retaining washer 167. Appropriate clearances are provided between the inner faces of the actuating member 166 and plate 77 and between the flange of the journal member 165 and the outer face of the plate member 77, whereby free reciprocation of the wire transfer device 42 in the slot 160 is assured. Surmounting the ball bearing 164 is the wire gripping roller 168 which is rendered free running by the use of the ball bearing 164 and the provision of appropriate clearances. The disk like flange of the journal member 165 is of a diameter considerably greater than the outer periphery of the grooved roller 168 and its periphery is coned to deliver the wire strand which engages it toward the pulley 168 and is provided further with a bead 170 which overlies the inner periphery of the roller 168 and insures delivery of the wire engaged on the cone to the groove of the roller. Extended outwardly and rearwardly from the head 163 of the gripper 157 is a pointed portion 171. Engaged with the point of this portion is the tip of a spring tongue 172 the root of which (see Figure 1) is secured to the outer wing of a U-shaped clip 173 (see Figure 2) which in turn is secured to the main body of actuating member 166 at a point forwardly removed from the gripper 157. The depth of the U-shaped clip is such that it may ride freely over the upper edge of plate 77 above slot 160 without contacting the edge of the plate. Actuating link 166 is arched over the shaft 88 of the timing mechanism 45 to connect with the rearwardly extended crank arm 174 which is oscillated by shaft 88. When this shaft is oscillated counterclockwise wire transfer device 42 carries gripper 157 forwardly and downwardly to the extreme lower end of slot 160 there to slip extension 171 of head 163 under the wire loop projected by the needle at its bight portion extending between rollers 153. As the wire slips over the radially outwardly and forwardly inclined end 171 it slips under the tongue 172. Thereupon when the wire transfer device 42 is drawn rearwardly by the following clockwise oscillation of shaft 88 and crank 174 the loop of the wire slips over the head 163 and falls into the groove of pulley 168 either directly or by way of engagement with the conical periphery of engaging flange 165. When gripper 157 of the wire transfer device 42 reaches its extreme forward position its roller 168 and the wire which is engaged in its groove pass under the tip of a cantilever type bar spring 175 the root of which is anchored in a block 176 fixed to the outer face of the plate 77. This spring 175 retains the extremity of the loop in position about the roller and upon the gripper 157 despite the slack which is created as a bale loop commences to be formed about a newly initiated bale within the bale case 47.

*Wire holding and guiding means*

The bar spring 175 just described is of course a wire holding means of a sort. The three principal such means however are associated directly or indirectly not with the wire transfer device 42 but with the wire laying device 41. They have to do outstandingly with the laying of the free end of the bale loop in the wire tying device 40. The first of these three is comprised of bushing 120 about pintle 117 of gripper 112 in coaction with a Carboloy point 177 welded to the outer face of a slide 178 carried by the pintles 117 and 123 slidably upon the outer face of the pintle bearing bar 115. The forward end 180 of this slide 178 is out-turned and is borne upon by a spring 179 socketed in the rectangular head 124 of the pintle 123 to urge it normally rearwardly to a position in which Carboloy point 177 is disengaged from the periphery of bushing 120, which by the way is also made up of Carboloy. However, when the wire laying device 42 is in its extreme forward position the out-turned end 180 of the slide 178 engages the head 181 of a bolt 182 and a more powerful spring 183 confined beneath the head and between it and a bolt mounting block 184 secured to plate 77 presses the slide 178 rearwardly against the tension of the lesser spring 179 and causes Carboloy point 177 to engage any wire lying between it and the periphery of bushing 120 and firmly grip the wire. The hold of this means upon the wire is very firm and amply adequate to prevent the free end 185 of the bale loop from slipping over and past the wire laying device 41 and the transfer device 42 under the drag of the bale loop. This holding means 120—177 engages the free end portion 185 of bale loop 186 not far from its extremity 187 which has been cut from the immediately preceding bale strand. Indeed the engagement is effected the moment the wire laying device 41 comes to rest in its forward position, before or immediately preceding the twist and of course before the cut has taken place. Aiding this hold at this time is a Carboloy pin 188 welded to and projecting from the under side of the head 118 into contact with the disk 115. Bar 115 is widened downwardly at this point and pin 188 so positioned that it influences the ultimate angle of lay of the bale strand and the ultimate angle at which the cut is made following the twist.

The second holding means is associated indirectly rather than directly with the wire laying device 41. Its indirect association arises from the fact that it too acts to hold the free end portion 185 against the tension of the bale loop. It does not appear in Figures 9 to 11 but is to be clearly seen in Figures 1 and 2. It comprises a pair of mating wire clamping jaws 189 and 190 respectively fixed to the outer face of the lower forward part of mounting plate 77 and the down bent arm of the bell crank 191 pivoted to the mounting spring plate 77. These wire clamping jaws lie in the path of extension of the bale loop under the over arching bar 93 from the wire laying device 41 to the forward end of the bale. Normally the jaws 189, 190 are held apart as appears in Figure 2 but when bell crank 191 is moved clockwise they come together and grip the wire between them. The actuating means for the jaws is a long small diametered rod 192 which connects the outer arm of bell crank 191 through a yielding lost motion connection 193 to an actuating arm 194 borne on a rock shaft 195 associated with the primary timing mechanism 44. Actuation of this second holding means is timed to take place just before wire laying device 41 commences to move from the normal position of rest illustrated in Figures 9 to 11 to initiate the lay of the free end in the wire tying device 40. As wire laying device 41 leaves its normal position, extension 180 from slide 178 leaves the head 181 of bolt 182 and, the movement of the head 181 under the urge of the heavy spring 183 being limited by a nut 196 on the opposite end of the bolt, slide 178 is relieved of the pressure of spring 183 and the lesser spring 179 moves slide 178 forward and releases the first hold of elements 120, 177 upon the free end portion. Already however, the means 189, 190 is in action and bale loop tension does not displace the free end portion 185, or is the tension itself lessened.

The third holding means associated with the wire laying device 41 is a yielding holding means brought into action as the hold 120—177 is released under the urge and the yielding action of the lesser spring 179. It consists of a second Carboloy point 197 welded to the slide 178 in line with the point 177 but behind the bushing 120 instead of in front of its as is the point 177. It yieldingly engages the rear strand of the free portion 185 when the hold on the front strand is released. So yieldingly engaging the wire it will resist the travel of the wire around the bushing 120 and about roller 168 of the transfer device 42, as the wire laying device 41 progressively pushes upon the free end 185 in its movement along its wire laying path defined by groove 144 in plate 77. This resistance to the passage of the free end 185 as the laying engagement of device 41 progresses toward the extremity 187 is added to by the bend of the wire over the lay positioning Carboloy pin 188 and the lay is tensioned as it is made in the length of the lay between the rearwardly moving pin 188 and the jaws 189, 190 of the second holding means which have established their hold.

Figure 1:
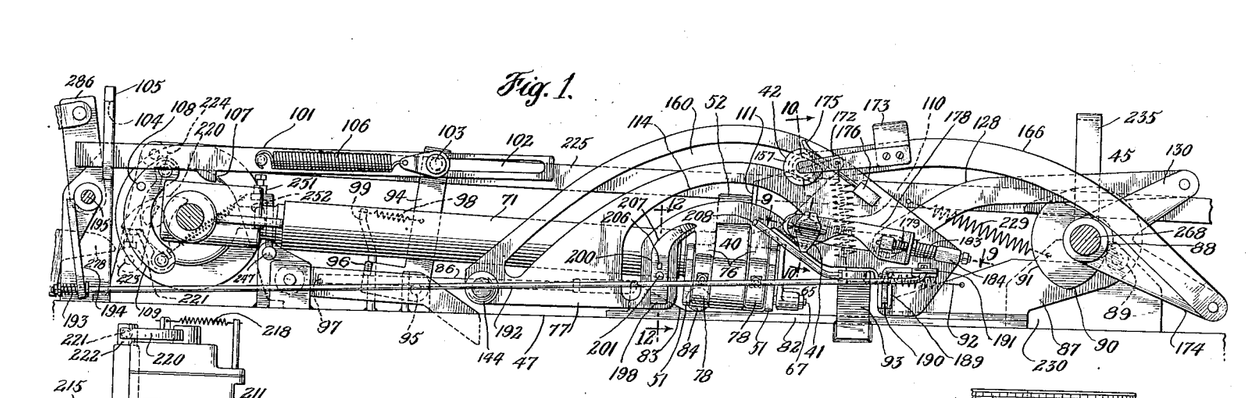
Figure 1 is a side elevation of the mechanism as mounted on the top of a bale case and viewed from the right hand side as one faces in the direction of progress of a bale through the bale case, that is to say faces forwardly of the bale. The bale length metering wheel at the one end of the mechanism and a portion of the plunger latch at the other are omitted from this view.
Figure 12:
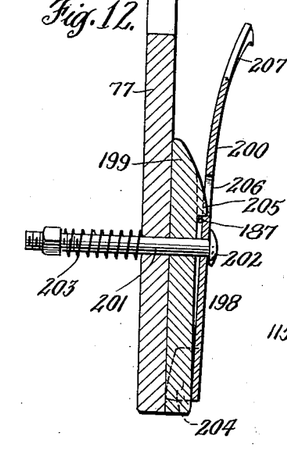
Figure 12 is taken on line 12—12 of Figure 1 to show the vertical cross section of the means for holding the extremity of the free end of a bale loop as laid by the wire laying device of Figure 9, and to show the associated loop strand guiding means.

The fourth holding means is related to the wire laying device 41. It is the latch shown in vertical section in Figure 12 for holding down extremity 187 of the free end of the bale loop after the completion of the lay by the wire laying device 41. Denominated 198 it appears in its correct location mounted on supporting and guide plate 77 in each of Figures 1 and 2, positioned on the outer face of plate 77 between the extended lower end of slot 114 and the rear anvil number 51. It comprises vertically extending and upwardly flaring latching blades, the one 199 fixed to the outer face of supporting plates 77 and the other 200 yieldingly borne toward it by a pin slidably passed through both members and plate 77, the pin numbered 201 and having a head 202 yieldingly urging the body member 200 toward that of member 199 under the urge of a spring 203 adjustably confined upon the body of the pin. Pin 201 is the only means of holding the part 200 to the face of member 199. However, its verticality is assured by in bent ears 204 at its bottom which respectively lap the sides of the member 199. In the region where the flare commences a relatively narrow projection 205 from the face of member 199 projects through a complemental slot 206 in the body member 200. The under edge of this projection as can be judged from the shown position of the slot 206 in Figure 1 is substantially in alignment with the axis of the twister gear of the wire tying device 40 and the bottoms of the wire receiving slots in the gears and the associated anvils 51. As gripper 112 of the wire laying device 41 turns the bend of groove 114 in its rearward extension and goes vertically downward it pushes the extremity 187 between the upwardly flared ends of members 199 and 200 and spreads them slightly to enter the extremity 187 below the projection 205 where it is yieldingly held as shown in Figure 12. It is then freed from further engagement with gripper 112.

Two wire strand guiding devices are related to wire transfer device 42 and wire laying device 41 in their handling of the wire strands. The one is constituted by the upwardly and rearwardly flared extremity 207 of the member 200 of the latch 198. While the inner upwardly flared surface of member 200 assists in guiding the free end extremity 187 to its latched position as shown in Figure 12, the upward and rearward and outward bend of the extremity 207 is successively engaged by the bale strand and the off strand of the loop carried by the gripper 157 of the transfer device 42, engaged on its upper outer curved edge to shift these bale and off strands successively outward of the extremity 201 thereby to avoid being caught by the latch 198.

The second guide has to do with the off strand of the loop as carried by the transfer device 42. It comprises a rod 208 anchored to the top of the arched cross bar 93 carried by the bale case 47 and projected first rearwardly just outside of the vertcial plane of lay of the wire strand and then widely upwardly and outwardly. In its upward reach it remains close to the plane of the lay until it commences to pass beyond the normal position of the wire laying device 41. So shaped and disposed, it catches the off strand of the loop carried by the wire transfer device 42 before the slack set up in it by the newly formed bale has been taken up by bale progress forwardly, and progressively carries the slack portion inwardly toward plate 77 and ultimately against the pin 188 (see Figure 1) where the slack being fully taken up the wire between pin 188 and the roller 168 of the transfer device 42 become a portion of the free end 185 of the bale loop 186. Note that the downwardly depending end 118 of the gripper 112 of the wire laying device 41 (see Figure 1 also) overlies the guide 208 and receives the off strand beneath itself as it is delivered toward the pin 188 by the guide 208.

*The primary timing mechanism*

Figures 13, 14, 15, 16:
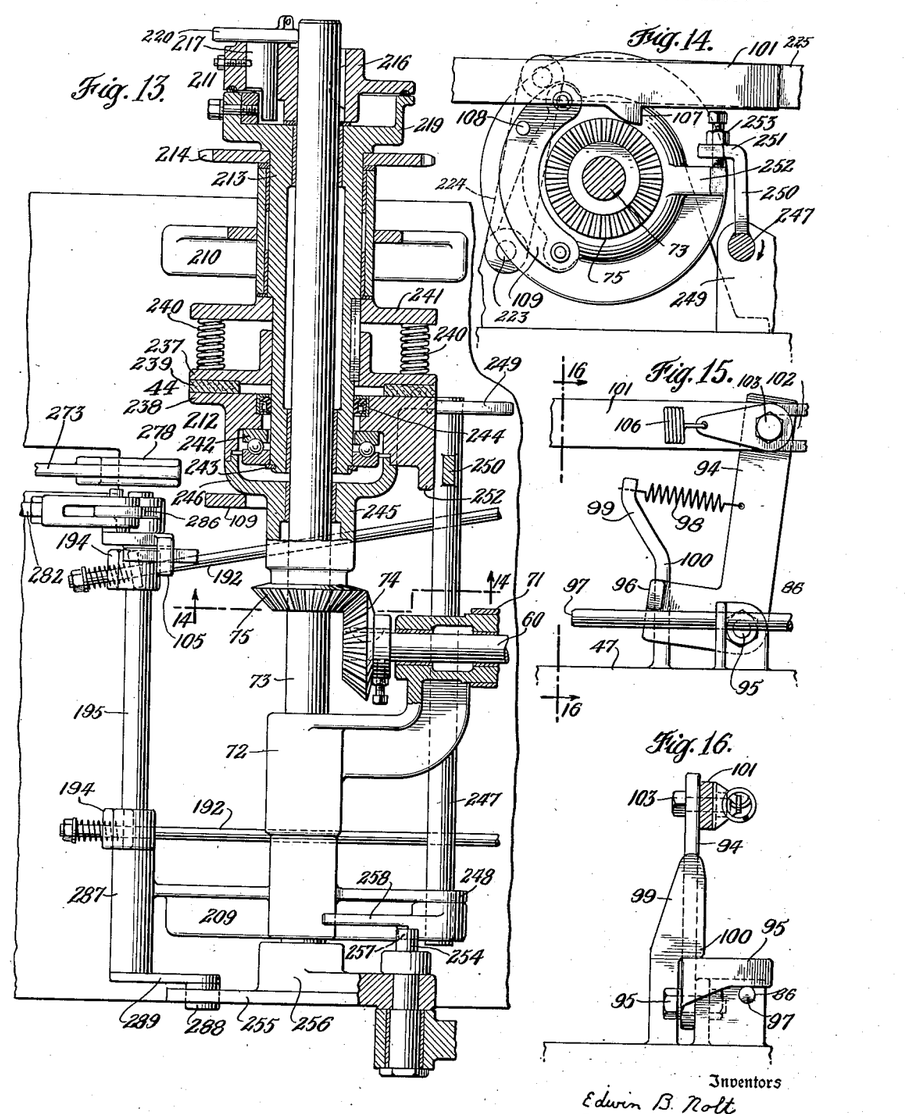
Figure 13 is a top plan view of the primary timing means of the mechanism with the needle and twister clutches shown in horizontal cross section.
Figure 14 is a vertical cross section of this timing means taken on line 14—14 of Figure 13; the figure shows the clutch control detent of the twister clutch and the cocking device associated with the stripper action.
Figure 15 is a side elevation of the latch or trigger device associated with the stripper section.
Figure 16 is a rear view of this trigger or latch of Figure 15 taken on line 16—16.

Figures 1, 2 and 13 show this mechanism outstandingly, though parts of it also appear in Figures 3 and 4. It is of a revolving character centered about a transverse axis embodied in a transverse counter shaft 73 supported and journaled from the bale case 47 by right and left bearing pedestals 209, 210. The outstanding components of this primary timing mechanism, a pair of one revolution and stop clutches 211, 212, and a constantly revolved sleeve 213, are arranged concentrically about the shaft 73. The drive of sleeve 213 is by means of a sprocket 214 connected by a chain 215 (see Figure 2) with a source of power (not shown). Sleeve 213 is journaled directly in the pedestal 210 while the shaft 73 is journaled directly in the sleeve 213 as clearly appears in the section in Figure 13. Clutch 211 is located on the left side of the bale case just outside of the pedestal bearing and the sprocket 214, which clutch 212 is located just inside of the pedestal bearing of the left side of the machine.

The driven element 216 of clutch 211 is keyed to shaft 73 to drive the same. We are not otherwise concerned with the character of this one revolution and stop clutch than to say that it is of the dog type which is tripped to go through its one revolution and stop movement by the counter clockwise rotation of pawl or dog 217 journaled in member 216 on an axis paralleling the axis of shaft 73 and biased to dog engaging position by spring 218 (see Figure 2). Suffice it to say that when so turned under the urge of spring 218 interdog engagement of driven member 216 with driving member 219 ensues and continues for the revolution. The result is that shaft 73 is driven through a complete revolution and then stopped. The pawl 217 is normally prevented from releasing the clutch by a clockwise bias against spring 218 set up by the engagement of its rearwardly projecting arm 220 (see Figures 1 and 2) with the head of an adjustable pin 221 carried by and extending radially upward from the outer end of a shaft 222 rockedly mounted at 223 on the pedestal 210. Shaft 222 is rocked counter-clockwise to move the head of pin 221 out from under the end of arm 220 by connection of its inner end through a vertically extending rocking lever 224 to the rear end of the long forwardly extending bar 225 reaching to the bale metering wheel 226 (see Figure 3). At the bale metering wheel 226 the end of the bar 225 is provided with a vertically faced downward offset 227 adapted to be engaged and cammed forwardly by a pin or roller 228 revolved by the metering wheel about its axis once each revolution of the metering wheel. A biasing spring 229 extended between the body of bar 225 and the pedestal 230 journaling shaft 88 of the secondary timing mechanism (see Figure 1) constantly tends to move bar 225 forwardly. When shaft 88 of the secondary timing mechanism is oscillated in a counter clockwise direction through geared connection presently to be described to primary timing device 44, a cam 231 carried by the hub of sprocket 154 on the left hand side of the machine (see Figure 2) under rides a lateral extension 232 from an angle bar 233 which is pivoted on the axis of shaft 268 or thereabouts, causing its end 234 which underlies the forward end of bar 225 just to the rear of shaft 88 to rise and thereby lift the forward end of bar 225 and remove its downward offset 227 from the path of movement of the pin 228. Thereupon the biasing spring 229 retracts the bar 225 and rocks the stop pin 221 of clutch 211 back into the path of arm 220 of clutch release dog 217, thereby insuring the stopping of the clutch at the completion of its revolution. Bar 225 is guided and retained in the plane of engagement of metering wheel pin 228 by means of a strap form link 235 erected upon the pedestal bearing 236 of shaft 268 as shown in Figures 1 and 2.

The second clutch 212 of the primary timing mechanism 44 is also a one revolution and stop clutch, but instead of being a dog type clutch it is a continuous torque slip clutch. Torque is continuously applied from driven member 237 to driven member 238 through a brake type clutch friction lining 239, loosely frictionally held between the opposed faces of driving member 237 and driven member 238. Member 237 is splined to the power sleeve 213 and yieldingly borne against member 238 through lining 239 by means of biasing springs 240 grouped about the axis of the clutch and pressed home by a clutch spring plate 241 also splined to the power sleeve 213. A thrust bearing 242 fixed by retaining ring 243 on the inner extremity of the power shaft 73 axially fixes the driven member 238 of the clutch. A grease seal 244 between the sleeve and the driven member 238 prevents grease from the bearing from reaching the clutch lining 239. A clutch power transmitting sleeve 245 is journaled on the shaft 73 just inside of the clutch and on its clutch end is coupled with the driven member 238 of the clutch, and in conjunction with the walls of the driven member annularly houses the thrust bearing 242. On its inner end it bears the driving bevel gear 75, the mate of the gear 74 on the power shaft 60 of the wire tying device 40.

*Timing control of wire tying device*

A rock shaft 247 paralleling shaft 73 in front of it and just above the bale case between bearing 248 in the pedestal 209 and the bearing 249 in an inwardly located bearing pedestal supported from the bale case 47 carries an upwardly extending dog arm 250 whose inwardly extended upper end overlies an integrally formed stop lug 252 on the driven member 238 of the clutch and adjustably engages it through a set screw 253. Despite the continuously applied torque urging member 238 and its connecting parts counter-clockwise they cannot revolve so long as the end 251 of the dog 250 overlies the lug 252. Rocking shaft 247 clockwise to a few degrees as indicated by the arrow in Figure 14 will free the clutch for revolution.

This rocking movement of shaft 247 is brought about whenever clutch 211 is operated for its one revolution and stop cycle and toward the close of the cycle, through the camming engagement of a pin 254 carried near the outer periphery of timing disk 255 whose hub is fixed to shaft 73 to be revolved therewith, with the under side of a camming offset 257 from the arm 258 carried by the outer end of the shaft 247. Arm 258 is urged by a biasing spring 259 between its extremity and a fixed point 260 (see Figures 3 and 4) in a counter clockwise direction, with the result that when pin 254 toward the close of the cycle of the movement of timing disk 255 slips past the offset 257 of arm 258, the shaft 247 is again oscillated counter-clockwise to place its overhanging end 251 again in the path of the lug 252, which once released is in the course of a revolution. Accordingly, at the close of the single revolution driven member 238 of clutch 212 again comes to a stop. Arm 258 as appears most clearly in Figure 3 normally rests against the outer periphery of the journal of shaft 73 in pedestal 209. This limits the inward movement of the dog 250 toward the lug 252. Thus the application of power to and its removal from the wire tying mechanism 40 is controlled.

*Actuation and timing of the needle movement*

The needle movement as has been outlined is derived in conjunction with a secondary timing mechanism 45. However, it is not directly connected with the timing mechanism per se. Timing disk 255 of the mechanism 44 operates through connecting rod 261 (see Figures 3 and 4 especially) to longitudinally reciprocate rack 262 and rack frame 263 in appropriate rack frame guides or gibs 264 associated with the base of the pedestal 265 of mechanism 45. A pinion 266 meshing with rack 262 and journaled in a bearing 267 projected laterally from the upper portion of pedestal 265 carries on the outward end of its shaft 268 the gear 154 from which the drive 154 of needle yoke 135 is derived. As has been said shaft 268 extends clear across the bale case through journal 236 and at its opposite end carries a duplicate drive 154 for the opposite side of yoke 135. Revolution of timing disk 255 being counter clockwise rack 262 drives pinion 266 first clockwise to pass needle 133 through the bale case with a wire loop and then counter clockwise to withdraw the needle from the bale case all in one revolution of the timing disk 255 as occasioned by the one revolution and stop clutch 211 released for the revolution by the metering wheel 226.

*Actuation and timing of the secondary timing means 45*

The vertically and inwardly extended arms 269 of rack frame 262 carry at their upper ends an inwardly displaced bar 270 paralleling the rack bar and provided with a series of horizontally arranged teeth in the form of pins 271 connected together at their outer ends and in their main bodies engaging the teeth of a sprocket wheel 272 mounted upon and driving the tubular timing shaft 88 of the secondary timing mechanism 45. This timing shaft 88 is journaled interiorly by any suitable means (none shown) to be oscillated about shaft 268 which times the needle means, but in the opposite direction to shaft 268. The fact that the pins 271 engage the sprocket 272 on its top rather than on its bottom as is the pinion 266 engaged by rack bar 262, occasions this reverse in oscillation. Thus the shaft 88 is oscillated counter clockwise when the needle yoke 85 is oscillated clockwise, and vice versa. Thus the wire laying device 41 and the wire transfer device 42 which are actuated from this timing shaft 88 are moved rearwardly to engage with the appropriate strands of the needle loop at the time the extremity 152 of the needle presents the loop into the vicinity of the tying mechanism 40, and thus they are withdrawn to perform the bale strand laying, free end determination, and free end holding operations as needle 133 itself is withdrawn from the bale case.

*Plunger latched mechanism 46*

As commonly done in automatic baling machines we plan to lock the plunger from withdrawal from the bale head during the presence of the needle 133 in the bale case. The simplified mechanism which we have devised comprehends the latch 273 pivoted to the top of the bale case 47 near its centre and pointing forwardly for oscillation downwardly to present its front end 275 behind the rear upper wall 276 of plunger 277, and so cause the usually provided slip joint in the plunger connecting rod (not shown) to open. Extension 278 from the front end 275 engages the top of the bale case in advance of the latch slot and limits its downward movement. A retracting spring 279 engaged between the upwardly extending arm 280 and a fixed pedestal rising from the top of the bale case constantly urges the latch to its released position. The latch is rocked forwardly to engage the top of the plunger 277 on the forward stroke of the plunger and ultimately to snap behind its rear wall 273 by forward pull on the rod 282 which compresses an overpowering spring 283 confined between the rear end of the rod adjustably and a block 284 pivotally connected to the end of arm 280 and slidably supporting rod 282. Stop 285 fixed to the body of the rod in advance of block 284 prevents over extension of spring 283. Latch 273 is located very close to the primary timing mechanism 44, its timing disk 255, and the paralleling rock shaft 195 which bears arm 194 and pulls on rod 192 to actuate the holding means 189, 190. Pull rod 282 is connected to the upper end of lever 286 projected upwardly from the opposite end of shaft 195 in the vertical plane of rod 282. Shaft 195 is journaled at its inner end in pedestal 105 (Figure 1) and at its outer end in a journal 287 supported from the right hand pedestal 209 of mechanism 44. This is shown on an enlarged scale in Figure 13. Shaft 195 is rocked and timed in its rocking by the engagement of the follower end 288 of an end crank 289 with the periphery of timing disk 255 of the primary timing mechanism 44. Normally the follower 288 lies in a notch 290 in the periphery of this timing disk 255, which periphery is otherwise of circular form about the axis of timing shaft 73. At the inception of the counter clockwise movement of disc 255 follower 288 rises up the slope of the side of the notch 290 and onto the circular periphery, thereby pulling rod 282 and compressing spring 283 to urge the latch 273 toward the bale case, and to cause it to snap behind the wall 273 as the plunger passes it. Because the power drive 213, 214, 215 of the driven member 219 of clutch 211 is as usual so geared to the plunger movement as to effect clutching engagement with the driven member 216 only when the plunger 277 approaches the end of its forward stroke, latch 273 becomes effective at that time. It is at that time that movement of the needle 133 through the bale case is initiated.

*Over-all operation*

Referring now to Figures 20 to 34 inclusive, the diagrammatic figures, the coordinated functionings of the several principal devices which we combine into our unit mechanism and through which we attain the aims and objects we have had before us—can now be fully understood and appreciated. In the diagrams the several devices which make up the wire tying mechanism as a whole are for the most part represented by their salient elements. Yet in the interest of simplification of the diagrams, for the most part the numerals applied to these elements are the numerals applying to the devices as a whole. However, wherever clarity is improved by utilization of the specific number applied to the diagrammatically used salient part, such specific number is used. Additional numerals have been applied to the wire flowing from the bulk coil as follows: 291, the wire emanating from the bulk coil (not shown) through the wire guide tube; 292, the bale strand of the needle loop; 293, the off strand of the needle loop; 294, the bight of the needle loop; 295, the ultimate tie or twist of the bale loop as comprised of the twisted lays of the free end 185 of the bale loop 186 and the bale strand end 292 as derived from the needle loop.

Figures 29, 34:
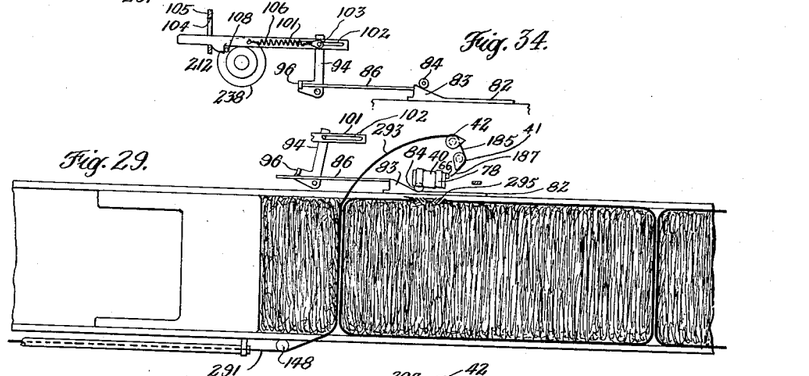
Figure 34 is a diagrammatic elevation of the stripper triggering action just prior to the stripper release pictured in Figure 29.
Figure 30:
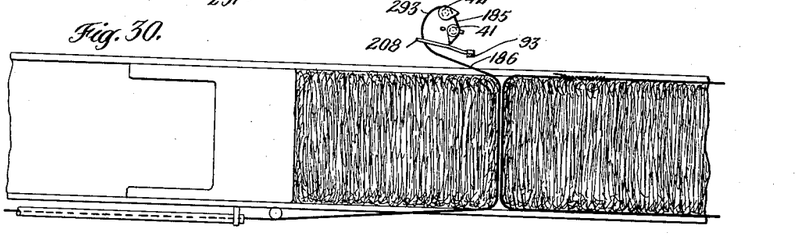
Figure 31:
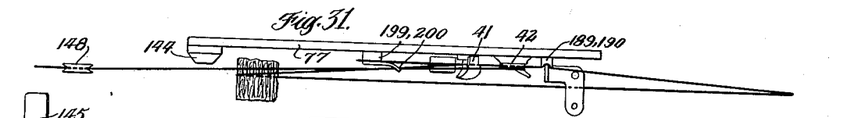
Figure 31 is a plan form diagram of the wires as they extend about a bale and through the wire tying mechanism in a stage intermediate those stages illustrated particularly in Figures 25 and 26, the scale being somewhat enlarged over the scale used in Figures 25 and 26.

To begin with of course, all of the parts of the mechanism are completely idle in their normal positions, that is to say are not in motion though some of them are in static action. This normal position of all the parts is that which they are shown to occupy in Figures 1 to 4 and for the most part in detail views and cross sections. Of the diagrams Figures 29 and 30 and Figure 20 in so far as they represent the mechanism in diagram, represent it at rest. The relations of the parts and of the various portions of the wire being used to each other and to the bales as shown in Figure 29 are those which obtain at the beginning of formation of a bale. Except for the fact that two completed bales are shown in the forward portion of the bale case 47, the situation is precisely that which exists when the machine is first started, just after it has been initially first threaded with wire. To thread the machine (referring to Figure 29) wire 291 from the bulk coil is threaded vertically through the case by hand, first threading through the guide device 143 (Figure 19 on the same sheet) and over guide roller 148, then through the vertically aligned needle openings in the bottom and top of the bale case 47, then around the wire transfer device 42 and finally around wire laying device 41 with the extremity 187 projecting just below it. The threading through devices 42 and 41 will be effected by the operator just as has been outlined in connection with the detailed description of Figures 9 to 11. Some slack in the created off strand 293 will be present, the free end portion 185 will be prevented from leaving the wire laying device 42 by the cantilever spring 175 (Figure 1 and Figure 2) which retains it in the groove of roller 168 (Figure 10), and the end 187 will be firmly held between the Carboloy bushing 120 and the Carboloy point 177 of device 41 as clearly appears in Figures 9 and 11. With the wire so preliminarily engaged with the mechanism at large, the baling machine is ready for the baling to commence. As the baling progresses as shown in Figures 29 and 30 and the length of the new bale progressively increases, bale loop 186 is formed from the slack of the off strand 293 and additional wire 291 drawn beneath the bale from the coil supply. When the slack of the off strand 293 is almost used up this strand engages the widely reaching prong of the guide 203 and the strand is guided surely to and into engagement with the front side of wire laying device 41 to occupy the position shown in Figure 11, to engage around the pin 188, and become a part of the free end portion of the bale loop, that part locked around devices 41 and 42 and designated 185. Through this process the length of the free end portion is accurately metered, for the tension of the bale loop 186 draws the portion 185 tightly around pulley 168 of the transfer device 42 and the pin 188. This metering is completed shortly before the bale has reached its full length, and it is clearly illustrated in diagram in Figure 20.

Figure 21:
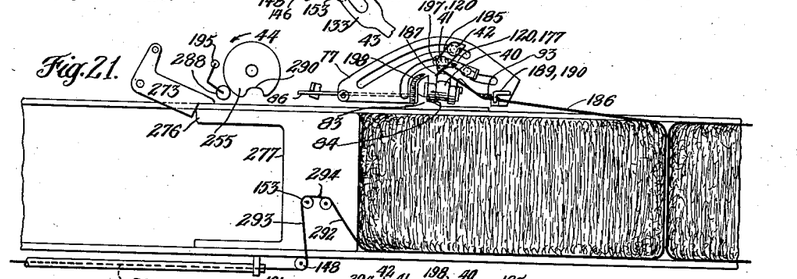

Shortly after this the bale reaches its full length and the bale length metering wheel 226 (shown symbolically in dot and dash lines) will trip the one revolution and stop dog clutch 211 of the primary timing device 44 to pilot the start of primary timing disk 255 on its revolution counter clockwise. However the clutch does not start on its revolution until the plunger is near the forward end of its stroke because its driving member is so geared to the plunger drive that the driving dog does not engage the tripped driven dog until this time. (This is well understood in such mechanisms and is standard practice in the art.) Figure 21 shows the relations of the parts just after the revolution has started when primary timing disk 255 has made but a few degrees of its revolution. Plunger 277 has reached its extreme forward stroke, follower 288 has left notch 290 and rocked shaft 195 to project latch 273 into engagement with the upper side of the plunger and the latch has dropped behind plunger wall 276 arresting the plunger and holding it in its forward position. Simultaneously with the plunger latch operation holding means 189, 190 grips the free end portion 185 near to its juncture with bale loop 186, both the latch and the holding means are actuated from the same rock shaft. Simultaneously too, the needle movement 43 has projected needle rollers 153 of needle 133 into engagement with wire 291 and instituted the needle loop comprised of a bale strand 292, off strand 293 and bight portion 294 bridging the gap between the rollers 153. Simultaneously too, oscillation of the secondary timing mechanism 45 (not shown in the diagram but connected as described to the primary timing disk 255 to be oscillated simultaneously with the needle movement 42) through its various link connections with the wire transfer device 42 and the wire laying device 41 has instituted the rearward movement of these devices as clearly appears, and moved both of them a short distance. The very inception of this movement will have released the hold 120—177 near the extremity 187 of the free end 185 and instituted the yielding hold 197—120 between the front Carboloy point 197 and the Carboloy bushing 120 (see Figures 9 to 11 once more). Already therefore as clearly appears in Figure 21 the free end portion 185 is being drawn past devices 41 and 42 against the resistance of hold 197—120 by the push of wire laying device 41 against the wire held firmly by clamp 189, 190. Soon device 41 will commence laying free end 185 in the twisting device 40. Already the secondary timing mechanism 45 has drawn cam 83 underlying the wire tying device 40 forwardly and through underlying roller 83 commenced to lift wire tying device 40 into position to have its wire twisting gear and associated anvils receive the lay of the free end. Wire laying device 41 as its rearward movement advances progressively engages the free end 185 nearer and nearer to its extremity 187 and so lays the free end in the tying device 40 under tension as imposed by the yielding resistance of devices 197, 120 acting against the fixed hold 189, 190. This fixed hold also insures the preservation of the tension in the bale loop 186 as the needle movement 43 develops the needle loop upwardly and completes the wiring around the bale.

Figure 22:
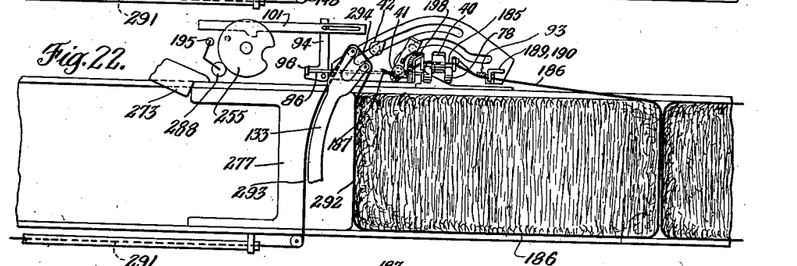

As the wire laying device 41 reaches near to the end of its over arching path of movement the path turns sharply downwardly and device 41 reaches and projects downwardly the extremity 187 of the free end portion 185. This movement completes the laying of the free end in the wire tying device 40 whose lay receiving members have in the meantime reached their fully raised positions and therefore received the lay on the horizontal axis of the twister gear and its associated anvils. (The device 40 will now remain in raised position for follower 89 will have been reached by the circular portion 91 of cam 90 (Figure 1).) It will remain raised until the twisting and cutting operations are completed. This is the situation when the primary timing disk 255 has completed somewhat less than one-half revolution. Figure 22 depicts it. Shortly before this the extremity 187 will have passed entirely out of contact with the wire transfer device 42. This latter device and the needle 133 will have now come closely adjacent to each other and wire transfer device 42 will soon be in a position to engage the bight 294 of the needle loop. Thus while wire laying device 41 has completed its rearward stroke and accomplished its lay, wire transfer device 42 has a further distance to go before it will have completed its stroke. The next few degrees of movement of the primary timing disk 255 effects this completion just as it reaches half revolution of travel, for at this juncture secondary timing device 45 will have completed its counter clockwise oscillation and momentarily come to rest before starting its clockwise oscillation.

Figure 23:
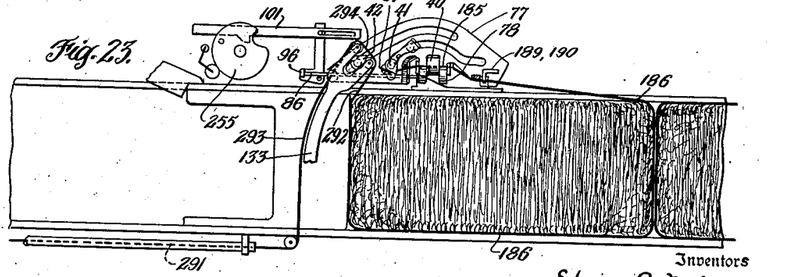

This situation is illustrated in Figure 23. Here wire transfer device 42 has passed between the forks of the needle 133 and already the bight 294 of the needle loop is hooked beneath the spring 172 and behind the head 157 (see Figure 10 and accompanying explanation) and bight 294 therefore is in a position to be slipped into engagement with the pulley 168 as the return reciprocation of the transfer device 42 commences. In the meantime however, the wire laying device 41 has withdrawn vertically upwardly a short distance to some extent to free itself from engagement with the extremity 187. This withdrawal movement is due to the fact that crank arms 130 and 174 are angularly spaced apart on shaft 88 (see Figures 1 and 2)—spaced apart to an extent resulting in a throw of crank 130 slightly past center at the extreme of its counter clockwise oscillation whereas crank 174 does not pass center. The result is a dwell of the wire laying device 41 in the vertically downward extension of its path and a short oscillatory movement in this path. Oscillatory movement helps to free it of the wire extremity 187 while the dwell insures its remaining in the rear portion of its path long enough to receive the bale strand from the wire transfer device 42. One may say therefore device 41 leads device 44 on their rearward movement and lags it on their forward movement.

Figure 24:
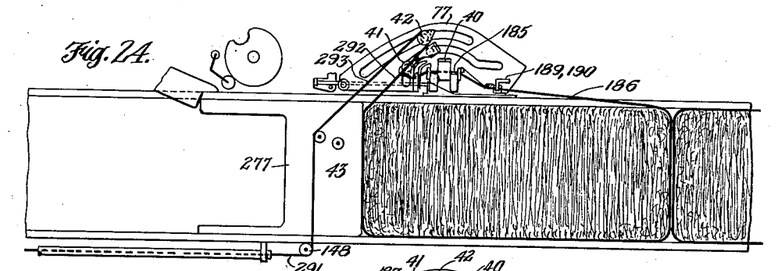
Figure 25:
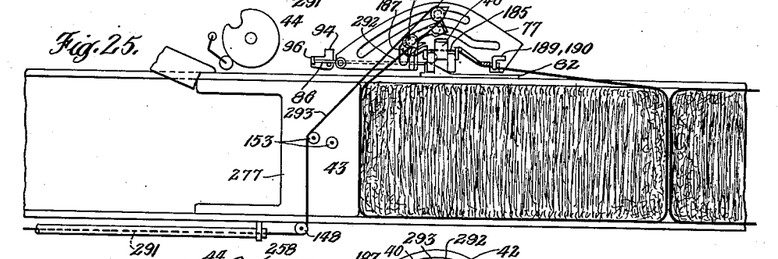

The next 90 degrees of revolution of primary timing disk of the mechanism 44 measures the period during which bight 294 is definitely engaged by the wire transfer device 42 and the wire transfer device 42 first elongates the needle loop as the needle itself withdraws from the bale case and from contact with the loop, and then the wire transfer device actually transfers the bale strang 292 to engagement with the wire laying device 41. The two diagrams Figure 24 and Figure 25 picture this transfer action in its later stages. In Figure 24 the needle has withdrawn from a position above the bale case to a position within it and is on its way out of the bale case. Bale strand 292 lies directly across the outer face of device 41 and is rapidly approaching engagement with that device. In Figure 25 wire transfer device 42 has actually placed bale strand 292 into wire laying engagement with device 41. Because head 118 at the time of transfer actually projects outwardly beyond and laterally overlies guide 200 strand 292 passes outside of guide 200 and does not enter latch 198. At this time the wire laying device 41 has withdrawn entirely from the lower downwardly coursing portion of its path and removed itself entirely from the free end extremity 187, and is about to commence the laying of the bale strand 292 on top of the already laid free end portion 185.

At this juncture it is time to notice the functioning of the free end extremity latch 198 which began at the stage illustrated in Figure 22 when wire laying device 41 first plunged the free end extremity 187 toward its lowermost position as the close of the free end lay was neared. Just at this time the extremity 187 is passed between the flared upper portions of members 199 and 207 of device 198 (see Figure 12) and guide 207 yields outwardly against the tension of spring 203 to admit extremity 187 below the latching projection 205 where it is held against dislodgement and the lay of the free end 185 of the bale loop is thereafter prevented from dislodgment either under the spring of the wire or under the freeing movement undergone by the wire laying devcie 41 during its dwell during the commencement of its return stroke for the lay of the bale strand 292. This holding means for the extremity 187 continues to function until the tie or twist itself is complete and has been released to the bale side, as will be seen from subsequent description.

Figure 9:
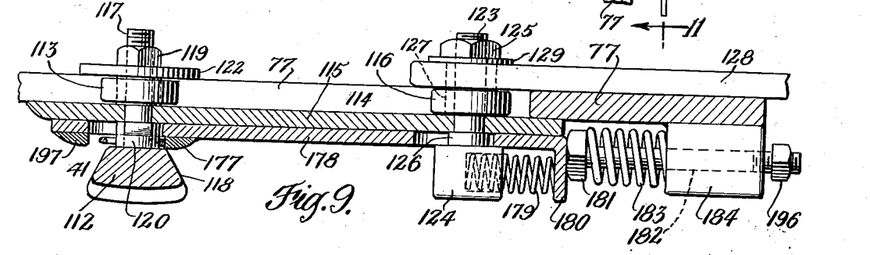
Figure 9 is a horizontal section taken on line 9—9 of Figure 1 showing the wire laying device per se.

The lay of the bale strand 292 was commenced and is completed as the primary timing disk 255 courses through its final 90 degrees of movement and the actual tie or twist is commenced just as the revolution of disk 255 nears its full completion. The achievement of the lay is depicted in diagram Figure 26. Here the needle symbolically represented by its head rollers 153 which originally defined the bight 294 of the loop has entirely withdrawn from the bale case, and both wire transfer device 42 and wire laying device 41 have returned to their normal positions at the forward extremities of the slots which defined their paths of movement. The bale strand is shown as completely laid in the anvil and twister gear members of the wire tying device 40. One-half of a new free end portion 185 has been metered by the reach of the wire loop comprised of bale strand 292 and off strand 293 from the engagement of wire laying device 41 to the engagement of wire transfer device 42. Once more the holding means 120, 177 has come into action to firmly grip this free end portion 185. Referring to Figure 9 it will be remembered that this new grip comes about through the engagement of the slide head 180 with the bolt head 181 to bring into play the overpowering spring 183 to press the Carboloy point 177 upon the wire 185 and grip the wire between itself and the Carboloy bushing 120. All is now ready for the tying or twisting operation of the tying device 40.

Figure 26:
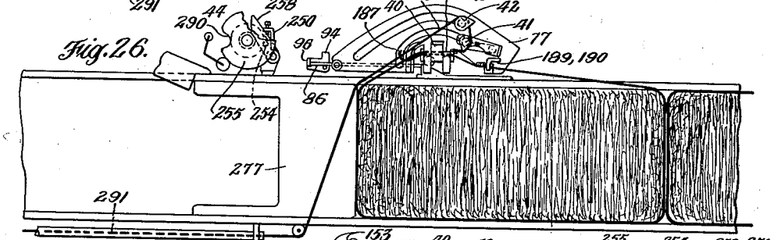

In the diagram of Figure 26 appear in diagram the elements which bring about institution of the twisting cycle. Tripping pin 254 carried by the primary timing disk 255 is depicted as about to engage and operate tripping arm 258 which controls the clutch 212 through which the wire tie device 40 is actuated and timed. (Refer to Figure 13 and Figure 14 as needful.) As diagrammed in Figure 32 and Figure 33 which represent closely successive stages of this engagement, the very next few degrees of movement of disk 255 results in coaction between pin 254 and the cam surface 257 of lever 258 and the rocking clockwise of the retaining dog 250 of clutch 212 with the result of the release of the retaining lug 252 for the one revolution and stop action of this clutch.

Figures 27, 32, 33:
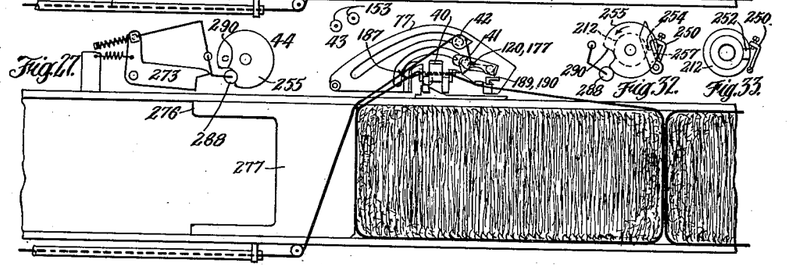
Figures 32 and 33 are diagrammatic elevations showing the relation between the latch operating mechanism of the plunger latch and the detent operating mechanism of the twister clutch and their relative timing between the phases illustrated in the diagrams of Figures 26 and 27.

The inception of this twisting action is diagramed in Figure 27. Its substantial completion is diagramed in Figure 28. In Figure 27 the twist has commenced, though depending upon the timing in advance of the completion of the revolution of the primary timing disk 255 the twist may be nearly complete or at least several turns complete. At any rate the revolution of the primary timing disk 255 has been completed and the follower 288 which actuates the latch 273 has again reached its berth in the notch 290, resulting in the release of latch 273 and the freeing of the plunger 277 to take another baling stroke. In the stage illustrated in Figure 27, when the hold 120—177 has been taken upon the newly formed free end portion the clamping hold 189—190 is released as clearly appears in the diagram. This follows from the same action of follower 288 which releases the latch 273. Just before timing disk 255 completes the revolution its trip pin 254 passes out of engagement with cam surface 257 as clearly appears from an inspection of Figure 32 and a knowledge of Figures 13 and 14, and retaining dog 250 is again projected by its biasing spring into the path of travel of the clutch lug 252. It is this that determines the stopping of the revolving of this clutch and of the actuation of the tying mechanism at the completion of one revolution.

Figure 28:
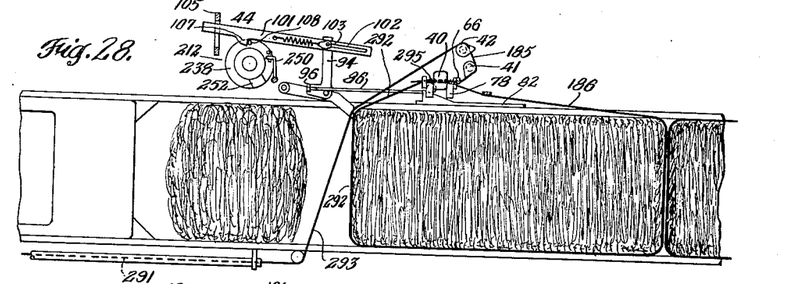

In the stage shown in Figure 28 however, this revolution has not yet been quite completed although the lug 252 is shown as again approaching engagement with the dog 250. It is at this juncture that the wire cutting device shown with greatest clearness in Figure 5 and Figure 6 is cammed into action by shaft 60 to sever the bale strand between its lay in the typing device and the twist which has been achieved and the wire laying device 41. For simplicity's sake and by reason of the difficulties in showing this action on the small scale of the diagrams it has been omitted but the cutting edge 66 of the cutters has been diagramed, and in Figure 29 is appears more clearly in juxtaposition to the new free end extremity 187. The timing of the actuation of the cut will be the more fully appreciated when it is observed that because bevel gears 74, 75 (Figure 13) have a one to one ratio shaft 60 makes but one revolution as does clutch 212. Accordingly the cams which actuate the cutters (see Figures 5 and 6) are readily adjusted to achieve the cut of the bale strands at a time appropriately related to the completion of the twisting operation. It will be born in mind of course that by reason of the fact that twister drive gear 55 and the twister gears 49 have a step up relation to eah other such that the twister gears make several revolutions during one revolution of the twister gear 55. The twist is therefore all but complete at the time the cut is made and is completed just after the cut is made.

In the stage illustrated in Figure 28 when the twist is near complete and the cut is about to take place, the release of the latch 94 and its latching dog or detent 96 is about to commence. Pin 108 carried by driven element 238 of clutch 212 is moving bar 101 to stress the spring which urges it forward and to cock it for the releasing hammer blow. This action will release the wire tying device 40 for return to its lower position by releasing rod 86 for rearward movement of the cam 83 which will permit the roller 84 to ride down its face towards its bottom most position. Figure 34 depicts bar 101 in substantially the fully cocked position and the moment later pin 108 will leave the dog 107 and cause bar 101 to fly forwardly as illustrated in Figure 29 to effect the release. It will have been born in mind that the wire tying device 40 and its component parts have remained in elevated position from inception of the first wire lay started at the stage shown in Figure 21 through all subsequent wire laying and wire transferring stages and throughout the wire tying and cutting stages, up to and including the stage outlined in Figure 28.

Figure 29 diagrams the relations of the parts as the wire tying mechanism at large again comes to a state of rest. The new wad of hay shown before the plunger in Figure 28 has been pushed into place at the extreme forward stroke of the plunger and the new bale loop is in process of being formed. The finished bale is being pushed before it. The new bale has been increased in length in Figure 30 and the cycle we have just now completed in description is soon to be followed by the next succeeding cycle, that which is to mark the tying of the next bale form.

In the foregoing operation it will be noted that the upward, outward and rearward flaring of the outer member 200 of latch 198 coacts with the direction of drag of the bale strand 292 and the off strand 293 by the wire transfer device 42 to prevent these strands from entering the latch 198, and the insuring that the bale strand 292 follows the wire laying device 41 while the off strand 293 remains free not only of the latch 198 but also of the wire tying device 40. As can be seen from Figure 31, the bale strand and the off strand due to the angle of pull of device 42 from the bale and become engaged with the upper outer edge of curvature of the guide 200 and are deflected outwardly of it rather than inside of it. The bale strand because engaged with the wire laying device 41 before that device passes the guide 200 as shown in Figure 25 becomes laid in wire tying device 40 as shown in Figure 26, while the off strand 293 because not engaged with wire laying device 41 and because wire transfer device is in an elevated position as respects wire laying device 41 is extended free of the wire tying device 40 after the strand passes the guide 200, all as clearly appears in Figure 26.

Finally the stripping action of Figure 29 should be noted. As wire tying device 40 drops to its lower and normal position the twister gear and the associated anvils drop past the stripper element 78 with the result that the twist slides downwardly and outwardly over their downwardly and outwardly curved surfaces, and is then drawn abruptly inwardly with a snap action under the tension of the wire about the bale to come to rest upon the top of the bale as clearly appears at 295 in Figure 29.

We claim:

1. Mechanism for wire tying bales comprising a wire twister, means for holding the free end of a wire extended about a bale, needle means for projecting into the proximity of the free end of the wire that portion of the wire which is to be tied to the free end to complete the tie about the bale, a wire laying device juxtaposed to said twister for laying said portion of the wire in the twister to be joined to the free end, and a wire transfer device for engaging the wire as projected by the needle means and transferring it to the wire laying device.

2. Mechanism according to claim 1 in which the needle means projects the portion to be joined to the free end in the form of a loop comprising a bale strand and an off strand, together with means for imparting operative movement to said wire laying and transfer devices and for bringing the wire laying and transfer devices to rest while yet in engagement with the loop, and wire cutting means arranged to sever the bale strand between the wire laying device and the twister whereby the length of the free end lay is determined.

3. Mechanism according to claim 1 in which both the twister and the path of movement of the associated wire laying device are located a distance forwardly of the rear end of a bale being formed, the needle means projects the portion of the wire to be laid near the rear end of the bale, and the transfer device in its movement of transfer bridges the distance between the rear end of the bale and the twister and wire laying device.

4. Mechanism for wire tying bales comprising a wire twister, free end wire laying means for laying the free end of a wire extending about a bale in said twister, firm free end holding means effective to hold the free end firmly during the formation of a bale loop about a bale, yielding means for holding the free end during the lay, and means operative upon the institution of the lay to release the firm holding means and apply the yielding holding means.

5. Mechanism for wire tying bales comprising a wire twister, a free end wire laying device for engaging the free end of a wire extended about a bale and laying it in the twister, means for projecting the opposite end of the wire extended about the bale to the twister side in the form of a loop comprising bale strand and off strand, means projecting the wire laying device to engage the bale strand and lay it in the twister for joinder to the free end by twisting, means for severing the bale strand between the twister and the laying device, holding means for the severed end on one side of said device and holding means for the off strand on the opposite side of said device.

6. Mechanism of the character described comprising a wire tying device for tying together the mating ends of wire extended about a bale and embodying relatively movable wire twisting and wire stripping elements having different relative positions for wire twisting and wire stripping respectively, movable needle means for projecting the wire to be tied about a bale to the proximity of the tying device, a mechanical movement for operating the needle means, a mechanical movement for operating the twister element, means operated from the needle movement governing relative movement of the twister and stripper elements to their wire receiving relationship, and means controlled by the twister movement governing relative movement of the said elements to their wire stripping relationship.

7. Mechanism of the characteer described comprising a stationary wire stripping element, a wire twisting device having wire stripping and wire tying positions operatively correlated to the position of said stripping element, a spring biasing same to wire stripping position, means to raise the tying device to its tying position against its bias, means to latch the first mentioned means to hold the tying device in its tying position, and means to release the latch rendered operative following the tying operation.

8. Mechanism of the character described comprising a first timing means of a revolving character, a second timing means of an oscillatory character, means interconnecting said first and second timing means for coordinated operation, a wire twisting device located between them and embodying a wire twisting gear actuated from the first timing means and a wire laying element actuated from the second timing means, a free end wire holding means adapted to hold against dislodgment longitudinally of a bale the free end of a wire about the bale during the laying of said free end by said wire laying element, and means interconnecting said first timing means and said holding means to render the latter under the control of said first timing means.

9. In a mechanism of the character described, comprising a needle carrying arm mounted for oscillation about a fixed axis, a needle projecting from said arm on an arc about the axis of oscillation of the arm, and means for pivotally adjusting the needle in all directions about its region of mounting on said arm, said adjusting means comprising a fulcrum point of mounting of said needle on said arm together with a group of securing bolts independently adjustable relative to each other to produce movement about the fulcruming point of the needle on the arm in all directions.

10. Mechanism of the character described comprising a timing means of a revolving character, a wire loop threading needle oscillated from said timing means to present a loop of wire for tying of the wire about a bale, a wire tying device arranged to engage to loop and effect the tie, a needle point positioning gauge associated with the wire tying device, and means for adjusting the needle to cause oscillation of its point in a path contiguous to said gage.

11. A needle yoke and means supporting same for oscillation about a fixed axis, a disc secured to said yoke concentrically with said axis, a drive chain having its opposite ends connected to the periphery of said disc, a drive sprocket in operative engagement with said chain, means for causing oscillatory movement of said sprocket, the connection between said chain ends and the disc being adjustable to facilitate tightening of said chain and to permit adjustment of the range of oscillatory movement of the needle yoke.

12. In a baler wire tie mechanism, an oscillatory needle yoke, means supporting same for oscillation about a fixed axis, a disc fixed to said yoke concentrically with said axis, a flexible element connected to the periphery of said disc at spaced points, an oscillatory drive means in driving engagement with said element between its points of connection to said disc, said points of connection being adjustable about the periphery of the disc to vary the range of oscillation of the yoke.

13. Mechanism for wire tying bales comprising, a latch, a wire laying device movable in one direction past said latch to lay the free end of a bale strand in said latch, a transfer device movable in an opposite direction past said latch to carry a bale wire to said laying device, on the return movement of the latter, and means carried by said laying device for movement therewith in a path overlying said latch, the return movement of said laying device being so timed with relation to said transfer device as to block the said latch against entry by the bale wire carried by said transfer device.

14. Mechanism for wire tying bales comprising a latch, a wire laying device movable past said latch, a wire transfer device also movable past said latch to deliver a bale wire to said wire laying device, latch blocking means carried by said wire laying device for movement in a path across the entry to said latch, and means for moving said devices in timed relation such that the said blocking means covers and blocks the entry into said latch of said bale wire.

References Cited in the file of this patent
UNITED STATES PATENTS

| | | |
|---|---|---|
| 1,008,767 | Young | Nov. 14, 1911 |
| 1,505,480 | Manville | Aug. 19, 1924 |
| 1,871,885 | Howard | Aug. 16, 1932 |
| 2,037,211 | Campbell | Apr. 14, 1936 |
| 2,198,913 | Grounds et al. | Apr. 30, 1940 |
| 2,339,395 | Harvey | Jan. 18, 1944 |
| 2,355,644 | Haase | Aug. 15, 1944 |
| 2,391,470 | May | Dec. 25, 1945 |
| 2,528,538 | Nolt | Nov. 7, 1950 |
| 2,548,559 | Ronning et al. | Apr. 10, 1951 |
| 2,558,250 | Hill et al. | June 26, 1951 |
| 2,575,538 | Tuft | Nov. 20, 1951 |
| 2,634,840 | Bornzin | Apr. 14, 1953 |
| 2,651,252 | Pope | Sept. 8, 1953 |